United States Patent [19]

Seifert et al.

[11] Patent Number: 5,352,336

[45] Date of Patent: * Oct. 4, 1994

[54] REMOVAL OF LOW-BOILING FRACTIONS FROM HIGH TEMPERATURE HEAT TRANSFER SYSTEMS

[75] Inventors: Walter F. Seifert; Gary R. Buske; John B. Cuthbert, all of Midland, Mich.

[73] Assignee: The Dow Chemical Company, Midland, Mich.

[*] Notice: The portion of the term of this patent subsequent to Oct. 26, 2010 has been disclaimed.

[21] Appl. No.: 78,387

[22] Filed: Jun. 17, 1993

[51] Int. Cl.$^5$ ............................................. B01D 3/34
[52] U.S. Cl. ............................................. 203/49; 203/92; 203/95; 208/356; 208/362; 208/363; 585/835; 585/860; 585/867
[58] Field of Search ............ 203/49, 92, 96, 95, 203/98; 585/835, 860, 867; 208/236, 238, 356, 363, 358, 362; 95/168, 97, 171, 102

[56] References Cited

U.S. PATENT DOCUMENTS

| | | | |
|---|---|---|---|
| 3,322,667 | 5/1967 | Lawson | 208/356 |
| 3,384,577 | 5/1968 | Shaffer et al. | 208/362 |
| 3,605,850 | 9/1971 | Borst, Jr. | 159/16.3 |
| 3,857,902 | 12/1974 | Inomata et al. | 206/675.5 |
| 3,920,572 | 11/1975 | King et al. | 208/48 AA |
| 4,002,525 | 7/1977 | Baleri | 159/47.3 |
| 4,199,410 | 4/1980 | Ohrui et al. | 181/237 |
| 4,230,536 | 10/1980 | Sech | 203/89 |
| 4,236,973 | 12/1980 | Robbins | 203/10 |
| 4,424,117 | 1/1984 | Kuno | 208/211 |
| 4,437,940 | 3/1984 | Sussmeyer et al. | 203/49 |
| 4,440,601 | 4/1984 | Katz et al. | 203/24 |
| 4,472,325 | 9/1984 | Robbins | 261/96 |
| 4,713,089 | 12/1987 | Robbins | 203/10 |
| 4,720,327 | 1/1988 | Aquilia et al. | 203/96 |
| 4,783,242 | 11/1988 | Robbins | 203/87 |
| 4,822,480 | 4/1989 | Harandi | 208/212 |
| 4,828,702 | 5/1989 | Coever et al. | 203/49 |
| 4,842,621 | 6/1989 | Robbins | 95/102 |
| 4,853,088 | 8/1989 | Conway | 203/10 |
| 4,857,084 | 8/1989 | Robbins | 95/97 |
| 4,915,792 | 4/1990 | Zeilon | 203/49 |
| 4,995,945 | 2/1991 | Craig | 202/177 |
| 5,141,630 | 8/1992 | Grosboll et al. | 208/356 |

FOREIGN PATENT DOCUMENTS

| | | | |
|---|---|---|---|
| 1420094 | 10/1968 | Fed. Rep. of Germany | 203/49 |
| 0271820 | 9/1989 | Fed. Rep. of Germany | 203/49 |
| 2276076 | 6/1974 | France . | |
| 0439296 | 11/1974 | U.S.S.R. | 203/49 |
| 912186 | 7/1980 | U.S.S.R. . | |

OTHER PUBLICATIONS

Perry et al., "Technique of Organic Chemistry", Distillation, vol. IV, 1965, pp. 3–4.

Primary Examiner—Virginia Manoharan
Attorney, Agent, or Firm—Robert M. O'Keefe

[57] ABSTRACT

Water and organic low-boiling constituents in organic heat transfer fluids used to heat commercial processes are removed by introducing a gas such as nitrogen into a turbulent flow of the heat transfer fluid and separating gas which then contains low-boiling constituents from the heat transfer fluid of the heat transfer system. The gas containing low-boiling constituents may be sent to a condenser to return heat transfer fluid which also vaporizes into the gas, but to a lesser extent than the low-boilers, to the heat transfer system. The gas containing low-boiling constituents is then combusted.

7 Claims, 1 Drawing Sheet

REMOVAL OF LOW-BOILING FRACTIONS FROM HIGH TEMPERATURE HEAT TRANSFER SYSTEMS

BACKGROUND OF THE INVENTION

The present invention relates generally to heat transfer systems, and more particularly to the removal of low-boiling constituents from organic heat transfer fluids.

In the operation of many industries, heat transfer systems are employed to provide a heat source for many processes which are operated in the industrial plants. Oftentimes, organic heat transfer fluids are chosen to act as the heat transfer medium. In those instances, the organic heat transfer fluids are heated to the desired temperatures, usually between 400° F. and 750° F., and then pumped through piping or the like to one or more sites where the hot organic heat transfer fluids heat one or more processes.

Since the volume of fluid in the system varies with temperature, the systems contain an expansion tank or storage tank wherein a pad of inert gas, such as nitrogen, is usually maintained in a specified range of pressure over the hot organic heat transfer fluid. If the volume of fluid decreases, inert gas is added. In the event the pressure exceeds the maximum limit, such as when the volume of fluid increases, a control valve or manual bleed allows gas to escape.

It is known that organic heat transfer fluids degrade at high temperatures to form low-boiling constituents such as paraffinic or aromatic components or mixtures thereof. The higher the temperature, the faster the fluids degrade. These low-boiling constituents enter the inert gas pad in the expansion tank and, consequently, are released to the atmosphere when the pressure control valve activates. Fresh fluid is added to replenish the fluid lost due to degradation. Since fluids initially added to the heat transfer system may degrade at elevated temperatures and these systems typically house 2,000 to 4,000 gallons of fluid, a great deal of hydrocarbons are currently being vented to the atmosphere. A solution to this problem is one object of the present invention.

Water may also be present in the fluids. Water is undesirable in heat transfer systems because the presence of water and organic acids, which are formed from the oxidation of the fluids, can lead to the corrosion of metal components of the heat transfer systems. Moreover, water raises the vapor pressure of the system, which may cause vapor lock and relief valves to open which loses product. While water can be removed by pressure venting described above, this method is highly inefficient and does not achieve sufficiently low levels of water. Nevertheless, this method is often used in the start-up of a heat transfer system despite that it may take weeks to remove the water to begin actually running the system at elevated temperatures. A solution to this problem is another object of the present invention.

The operation of heat transfer systems as described above has been practiced virtually unchanged for decades.

SUMMARY OF THE INVENTION

It has now been found that a solution to the problems described above can be achieved by introducing a stripping gas into a turbulent flow of an organic heat transfer fluid. Thus, in one respect, this invention is a process for removing low-boiling constituents from an organic heat transfer fluid, the low-boiling constituents having a boiling point below that of the organic heat transfer fluid, comprising the steps of:

(A) introducing a stripping gas, in an amount sufficient to vaporize at least a portion of the low-boiling constituents into a turbulent flow of the organic heat transfer fluid;

(B) separating the stripping gas containing low-boiling constituents from the organic heat transfer fluid;

(C) removing organic heat transfer fluid from the stripping gas containing low-boiling constituents of Step (B) and returning the organic heat transfer fluid to the organic heat transfer fluid of Step (A); and (D) combusting the stripping gas containing low-boiling constituents from Step C.

BRIEF DESCRIPTION OF THE DRAWING

The single Figure shown in the drawing is a schematic representation of one embodiment of a system useful in practicing the present invention.

DETAILED DESCRIPTION OF THE INVENTION

Figure 1:
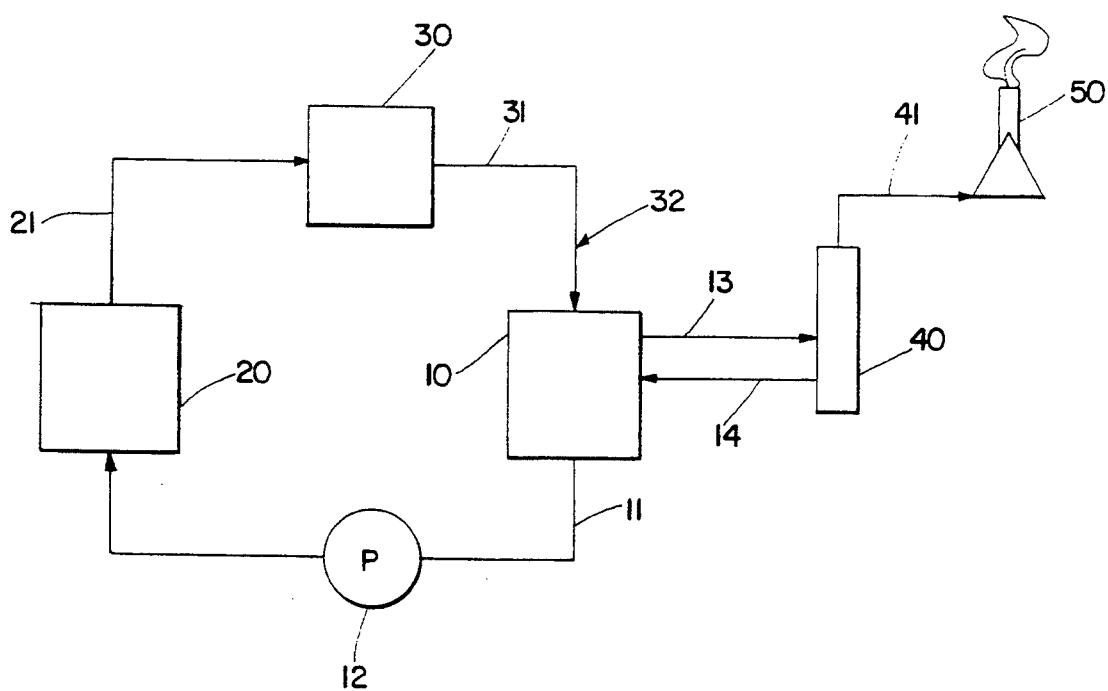

The process of this invention can be used to remove low-boiling constituents, such as water, from heat transfer fluids employed in either a liquid phase or gas phase heat transfer fluid system.

The organic heat transfer fluids which can be treated in accordance with the process of the present invention comprise many types and mixtures of organic materials. Non-limiting examples of suitable organic heat transfer fluids include aromatic oils, paraffinic oils, paraffinics, aromatics, alkylated aromatics, silicone oils or mixtures thereof.

Treatment of the organic heat transfer fluids by the process of the present invention serves to remove low-boiling constituents from the organic heat transfer fluids. For purposes of the present invention, "low-boiling constituent" is defined as a constituent having a boiling point lower than the organic heat transfer fluid and a vapor pressure higher than the organic heat transfer fluid to be treated. The low-boiling constituents can include water and organic compounds formed by degradation of the organic heat transfer fluids during the normal operation of heat transfer systems. Alkanes and low molecular weight aromatics are examples of such organic, low-boiling constituents which can be removed from heat transfer systems by the process of the present invention. One skilled in the art recognizes that the type and rate of degradation will vary depending on many variables, such as type of organic heat transfer fluid, temperature, and other process conditions. One skilled in the art further recognizes that organic heat transfer fluid will enter the stripping gas along with the low-boiling constituents to be removed, but will do so to a lesser extent due to its lower vapor pressure. The organic heat transfer fluid can be separated from the low-boiling constituents at a point later in the overall process, if necessary.

The stripping gas can be any gas known to those skilled in the art as useful in stripping processes. Non-limiting examples of suitable gases include methane, ethane, propane, butane, nitrogen, carbon dioxide, argon, and helium. If the primary concern is removal of light hydrocarbons, purified water as steam can be used as the stripping gas, although there will be an increase in water concentration to the system if water is used. The water can be removed in a subsequent step. Due to its low cost, relatively high purity, efficiency, and wide availability, nitrogen is the most preferred stripping gas.

The stripping gas and organic heat transfer fluid can be contacted in any suitable apparatus which insures effective contact between the stripping gas and the organic heat transfer fluid to be treated. The stripping gas may for example be injected or bubbled into the turbulent flow heat transfer fluid in the heat transfer system or in an apparatus external to the heat transfer system. Since heat transfer systems may be under pressure, the stripping gas must be under sufficient pressure to thereby be introduced into the heat transfer fluid. The heat transfer fluid is rapidly moving when contacted with the stripping gas such that the heat transfer fluid has a Reynolds number of greater than 3,000. Reynolds number is an abstract number characteristic of the flow of a fluid in a pipe or past an obstruction and is the ratio of the product of the density of the fluid, the flow velocity, and a characteristic linear dimension of the body under observation to the coefficient of absolute viscosity. Thus, the stripping gas becomes well dispersed in the heat transfer fluid and low-boiling constituents in the heat transfer fluid are extracted into the stripping gas.

Organic heat transfer fluid in a heat transfer system is normally maintained at a temperature in the range from about 300° F. to 750° F., which is a suitable temperature range for practice of this invention. Less stripping gas is required as temperature increases. On the other hand, more organic heat transfer fluid moves into the stripping gas with increase in temperature.

The volume of stripping gas required to treat a given amount of organic heat transfer fluid will vary depending on several factors including temperature, pressure, and the amount of low-boiling constituents to be removed. It has been further found that the amount of stripping gas required is a function of the relative volatility of the low-boiling constituent to organic heat transfer fluid. Consequently, the larger the relative volatility of the low-boiling constituent to organic heat transfer fluid, the less stripping gas that is required to effect removal.

The process of the instant invention can be operated intermittently or continuously.

The treatment process of the present invention is useful for removing low-boiling constituents which may be present in the organic heat transfer fluid at the time of starting up a heat transfer system, or which may accumulate over time. The process can reduce the water level to less than 1,000 parts per million ("ppm"), preferably less than about 100 ppm, more preferably less than about 1 ppm. The levels of low-boiling hydrocarbons can be reduced to less than about 1,000 ppm, preferably less than about 100 ppm, more preferably less than about 0.1 ppm.

The stripping gas containing low-boiling constituents can be disposed of by combustion. Since some organic heat transfer fluid will inevitably be contained in the stripping gas, however and therefore it is preferred to recover this useful fluid before disposing of the low-boiling constituents. The organic heat transfer fluid can be recovered from the stripping gas by a number of well-known techniques such as, for example, adsorption, absorption, condensation, rectification, or combinations thereof. The recovered organic heat transfer fluid can be recycled back to the heat transfer system. After removing organic heat transfer fluid from the stripping gas, the stripping gas containing low-boiling constituents can be combusted. Alternatively, the stripping gas containing low-boiling constituents can be condensed to a liquid and disposed of in an environmentally sound way.

The detailed operation of one embodiment of the present process, wherein the stripping gas is nitrogen, is further described by referring to the drawing. In normal operation of an industrial heat transfer system, the stream of organic heat transfer fluid containing low-boiling constituents is circulated from storage tank 10 through line 11 and pump 12 to furnace 20 wherein the heat transfer fluid is heated. The heated heat transfer fluid is then sent to plant 30 through line 21. Plant 30 represents a point or points in an industrial heat transfer system where the heat transfer fluid provides heat to processes. The heat transfer fluid returns to storage tank 10 from plant 30 through line 31. The description in this paragraph represents a generalized description of operation and a commercial operation may have additional lines, pumps, valves, furnaces, storage or expansion tanks, vents, and the like.

In the practice of this invention, during normal operation of the heat transfer system described in the previous paragraph, a stripping gas such as nitrogen is introduced into line 31 through line 32 in an area of line 31 where the Reynolds number of the heat transfer fluid is at least 3,000 whereby the stripping gas contacts the heat transfer fluid and low-boiling constituents of the heat transfer fluid dissolve into the stripping gas. The stripping gas, which contains low-boiling constituents, enters storage tank 10 wherein the stripping gas rises to the head space in storage tank 10. The stripping gas containing low-boiling constituents exits storage tank 10 through line 13 and enters condenser 40. Condenser 40 can be a packed column or an air cooled pipe. In condenser 40, heat transfer fluid present in the stripping gas is separated and returned to storage tank 10 through line 14. Stripping gas containing low-boiling constituents from the heat transfer fluid is sent to flare 50 through line 41.

What is claimed is:

1. A process for removing low-boiling constituents from an organic heat transfer fluid, the low-boiling constituents having a boiling point below that of the organic heat transfer fluid, comprising the steps of:
    (A) introducing a stripping gas, in an amount sufficient to vaporize at least a portion of the low-boiling constituents, into a turbulent flow of the organic heat transfer fluid;
    (B) separating the stripping gas containing low-boiling constituents from the organic heat transfer fluid;
    (C) removing organic heat transfer fluid from the stripping gas containing low-boiling constituents of Step (B) and returning the organic heat transfer fluid to the organic heat transfer fluid of Step (A); and
    (D) combusting the stripping gas containing low-boiling constituents from Step C.

2. The process of claim 1 wherein the stripping gas is selected from the group consisting of methane, ethane, propane, butane, nitrogen, carbon dioxide, argon, helium, and mixtures thereof.

3. The process of claim 1 wherein the stripping gas is nitrogen.

4. The process of claim 1 wherein the stripping gas is steam.

5. The process of claim 1 wherein the organic heat transfer fluid is selected from the group consisting of aromatic oils, paraffinic oils, paraffinics, aromatics, alkylated aromatics, silicone oils, and mixtures thereof.

6. The process of claim 1 wherein the organic heat transfer fluid has a temperature in the range from about 300° F. to about 750° F.

7. The process of claim 1 wherein of the turbulent flow of heat transfer fluid in Step (A) has a Reynolds number greater than 3,000.

* * * * *